United States Patent [19]

Bantum

[11] Patent Number: 5,790,805
[45] Date of Patent: Aug. 4, 1998

[54] DISTRIBUTED TIMER SYNCHRONIZATION

[75] Inventor: Michael G. Bantum, Sunnyvale, Calif.

[73] Assignee: NCR Corporation, Dayton, Ohio

[21] Appl. No.: 636,612

[22] Filed: Apr. 23, 1996

[51] Int. Cl.⁶ .................................................. G06F 15/163
[52] U.S. Cl. .................. 395/200.78; 395/551; 364/271; 364/DIG. 1
[58] Field of Search ................. 395/200.78, 200.33, 395/551; 364/271, DIG. 1

[56] References Cited

U.S. PATENT DOCUMENTS

| | | | |
|---|---|---|---|
| 4,531,185 | 7/1985 | Halpern et al. | 395/553 |
| 4,584,643 | 4/1986 | Halpern et al. | 395/200.78 |
| 4,827,401 | 5/1989 | Hrustich et al. | 395/551 |
| 5,434,997 | 7/1995 | Landry et al. | 395/182.1 |
| 5,535,217 | 7/1996 | Cheung et al. | 395/200.78 |
| 5,537,549 | 7/1996 | Gee et al. | 395/200.54 |
| 5,572,674 | 11/1996 | Ernst | 395/200.51 |

OTHER PUBLICATIONS

Mills, "Improved Algorithms for Synchronizing Computer Network Clocks," IEEE/ACM Transactions on Networking, vol. 3, No. 3, pp. 24455–254, Jun. 1995.

Bhonsle et al., "Virtual Process Clock: ATM Performance Measurements on UNIX Workstations," IEEE Global Telecommunications, pp. 893–897, Jun. 1995.

Couvet et al., "A Statistical Clock Synchronization Algorithm for Anisotropic Networks," Reliable Distributed Systems, 1991 10th Symposium, pp. 42–51, Mar. 1991.

*Primary Examiner*—John E. Harrity
*Attorney, Agent, or Firm*—Merchant, Gould, Smith, Edell, Welter & Schmidt

[57] ABSTRACT

A method, apparatus, and article of manufacture for establishing an unlimited number of independent, client-based timers, synchronized with a timer kept on a central server, is disclosed. After forming a client-server connection, a client sends a synchronization message to a server. The client receives a return synchronization message from the server, and computes a round-trip interval time between sending and receiving, by sampling a local hardware clock. The sending and receiving of synchronization messages continues for a predetermined number of times, until the client receives a final synchronization message from the server, the final synchronization message including the current local server time. The client then calculates the average one-way trip interval and adds that value to the received current local server time, to provide the client with a reliable estimate of the local server time. By calculating the difference between the client's own local time and the calculated local server time, a constant is derived which can be used to calculate local server time for any and all future client local times.

30 Claims, 5 Drawing Sheets

DISTRIBUTED TIMER SYNCHRONIZATION

BACKGROUND OF THE INVENTION

1. Field of the Invention

The invention relates in general to client-server computer systems, and more particularly, to establishing a number of independent client-based software timers synchronized with a timer kept on a central server.

2. Description of Related Art

Computers are increasingly being used in the client-server configuration. In a client-server configuration, multiple computers are interconnected by a communication network. Certain computers are clients and other computers are servers. A client generates process requests, which are communicated to a server for processing. That is, a client generates requests and a server processes client requests. A particular computer can at times be a client and at other times a server.

One application of the client-server architecture is online transaction processing. Airline reservation and banking systems are classic examples of online transaction processing.

A principal advantage of the client-server architecture is the sharing of resources. Data, application programs, data storage devices, processing power, printers, communication subsystems, etc. can be shared. The client-server architecture also makes it possible to keep a centralized database, which is shared, as opposed to maintaining multiple copies of the same data with the overhead of insuring that the data remains consistent at all locations.

With continuing improvements in computer and communication technologies, the client-server architecture is being increasingly utilized. Computers can now be interconnected with local area networks and wide area networks, including wired telephone lines, cellular systems, satellite communication links, etc. The increased speed of communication networks that has been achieved have expanded the practical applications of client-server systems.

One significant problem associated with the client-server architecture is the lack of protocol for passively estimating one-way network transmittal times for purposes of network load analysis. Another problem is the lack of a reliable method for doing performance benchmarking of client-server applications.

A solution to these problems would be to maintain a software-based timer at each client, which is synchronized with the timer kept on a central server. However, the prior art discloses no adequate method or apparatus for accomplishing this important feature.

It can be seen then that there is a need for an efficient, reliable way to establish and maintain an unlimited number of local, software based timers at clients, each synchronized with the timer kept on a central server.

SUMMARY OF THE INVENTION

To overcome the limitations in the prior art described above, and to overcome other limitations that will become apparent upon reading and understanding the present specification, the present invention discloses a method, apparatus, and article of manufacture for establishing an unlimited number of independent, client-based timers, synchronized with a timer kept on a central server. After forming a client-server connection, a client sends a synchronization message to a server. The client receives a return synchronization message from the server, and computes a round-trip interval time between sending and receiving, by sampling a local hardware clock.

The sending and receiving of synchronization messages continues for a predetermined number of times, until the client receives a final synchronization message from the server, the final synchronization message including the current local server time. The client then calculates the average one-way trip interval and adds that value to the received current local server time, to provide the client with a reliable estimate of the approximate local server time at that instant.

In accordance with further aspects of the invention, in one embodiment the step of computing the average one-way trip interval includes using a function which imposes an upper bound on the average one-way trip interval, the upper bound equal to a last round-trip interval of the synchronization.

In accordance with further aspects of the invention, a baseline constant is computed by subtracting current local client time from the approximate local server time computed in the above method.

In accordance with still further aspects of the invention, the local server time can be computed at any future instant, simply by adding the local client time at the given future instant to the baseline constant computed using the above method. In this manner, a client-based timer is created and maintained, synchronized with a timer on a server. Further aspects of the invention will become apparent upon reading and understanding the present specification.

As will be appreciated from the foregoing brief summary of the invention, the object of the present invention is to establish and maintain a number of independent, client-based timers, synchronized with a timer kept on a central server. One advantage of achieving this objective is that these timers can be used to passively estimate one-way network transmittal times for purposes of network load analysis. Another advantage of achieving this objective is that these timers can be used for performance benchmarking of client-server applications. Yet another advantage of achieving this objective is that a number of derived network performance metrics can be generated with these timers. Further objects and advantages of this invention will become apparent upon reading and understanding the present specification.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
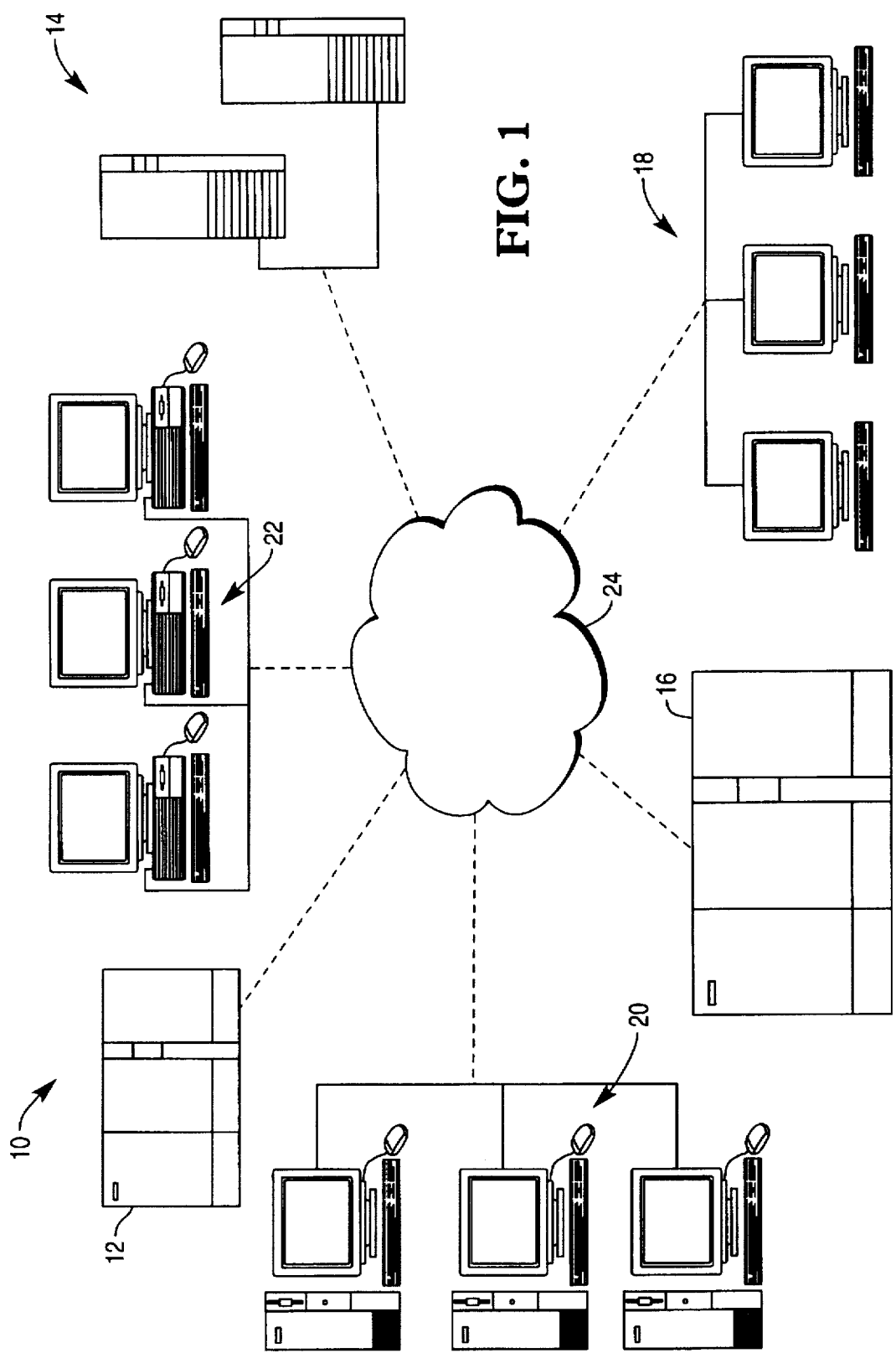
FIG. 1 is a pictorial diagram of a client-server system with which the present invention can be used.

FIG. 1 illustrates an exemplary client-server computer system 10 that could be used with the present invention. The system 10 includes: servers 12, 14 and 16; clients 18, 20 and 22; and a communication network(s) 24, also known as a two-way network messaging service, which interconnects the servers and the clients. The clients illustrated are workstations 20, personal computers 22, and terminals 18. Other clients, for example, laptop computers and personal digital assistants, are also possible. The servers are illustrated as mainframe and minicomputers; however, other computers, including smaller computers, could also take the role of the server. The communication network 24 can be comprised of many types of communication networks including local area networks and wide area networks, such as wired telephone lines, cellular telephone network and a satellite link. The communication network 24 can be made up of multiple networks of different types.

In the client-server system, the clients 18, 20, 22 generate requests that are processed by the servers 12, 14, 16. The requests are transmitted from a client 18, 20, 22 to a server 12, 14, 16 via the communication network 24. The servers 12, 14, 16 process the request and a response message is sent back over the communication network 24 to the client that made the request. For example, one of the personal computers 22 can send a request to the server 16 over the communication network 24.

Software, running on both the clients 18, 20, 22, and the servers 12, 14, 16, together with communication hardware, makes communication between the clients and the servers possible. This client-server management software has been referred to as middleware. Various client-server management software packages are commercially available. For example, TOP END® is available from AT&T Global Information Solutions Co. Other companies packages include: Tuxedo, available from Novell Corp.; Encina, available from IBM; CICS/6000, available from IBM; Peer Logic; Noblenet; System Strategies; and others.

The servers 12, 14, 16 can work individually, each as a separate server. In that case, a client 18, 20, 22 would connect one of the servers 12, 14, 16 and any client request would be sent to and processed by that server. Alternatively, the servers 12, 14, 16 can work together to form a server system, which appears as a single server to the clients.

The present invention is preferably implemented using one or more computer programs. Generally, the computer programs are tangibly embodied in a computer-readable medium, e.g. floppy disk drives, hard disk drives, or CDROM disk drives. The computer programs may be loaded from the medium into the memory of the client 18, 20, 22 and the server 12, 14, 16. The computer programs comprise instructions which, when read and executed by the client 18, 20, 22 and the server 12, 14, 16, causes them to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2A:
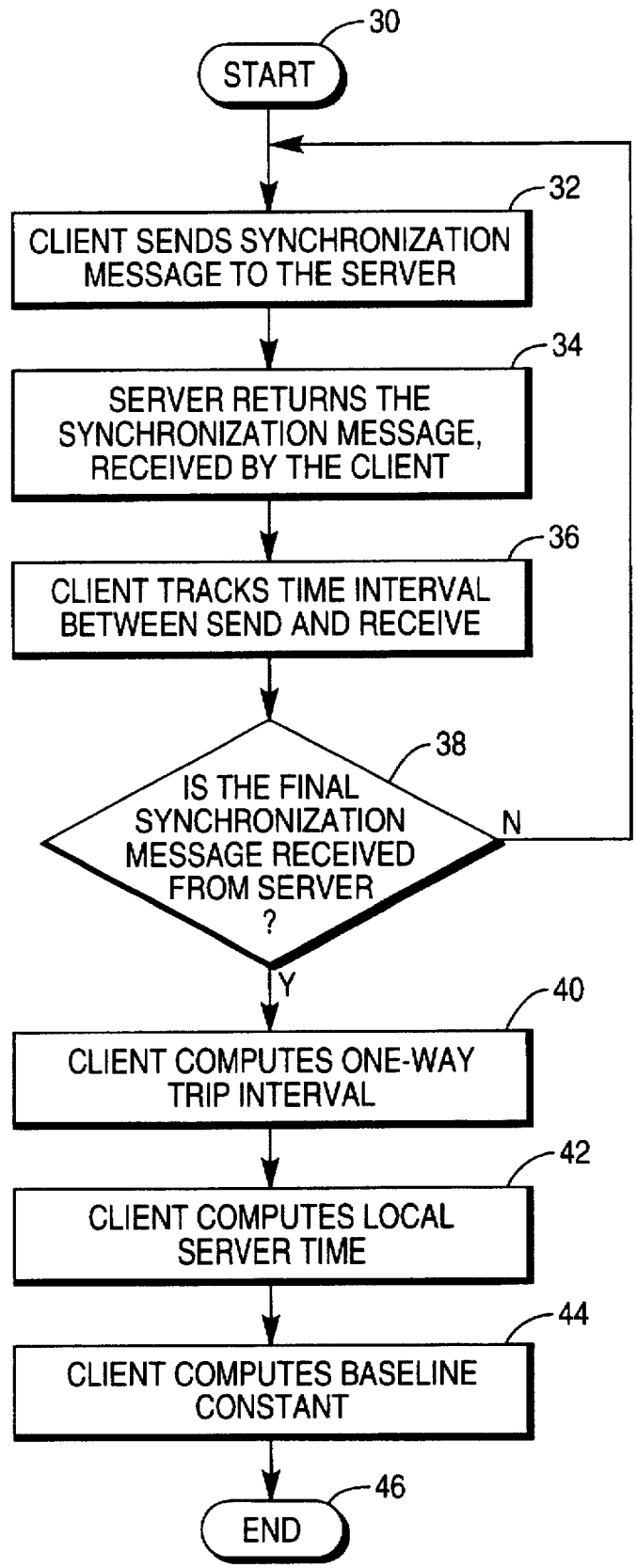
FIG. 2A is a flow chart depicting client application steps in accordance with this invention.

FIG. 2A depicts the logic performed by the software components on clients 18, 20, 22 in one preferred embodiment of the invention. Synchronization begins with step 30 and continues as the client sends a synchronization message to the server 12, 14, 16 at step 32. It is noted that, although this embodiment provides for client initiation of the synchronization, the invention is not so limited, and in fact the synchronization may be initiated at the server in further embodiments. After initiating the synchronization, the client at step 34 receives a return synchronization message from the server. The client tracks the time interval between the sending of the synchronization message and its receiving of the return synchronization message at step 36. Next, at decision step 38, the client checks to see if the final synchronization message has been received from the server. The final synchronization message is designated as such and includes the current local server time. If the final synchronization message has not been received, the client sends an additional synchronization message at step 32. If the final synchronization message has been received from the server, the client continues to step 40 and computes the one-way trip interval.

Once the one-way trip interval has been computed, client-side timer synchronization continues, and the client computes the local server time at step 42. In step 44, the client computes a baseline constant, for use in computation of future local server time. Client-side timer synchronization then proceeds to end step 46 which completes the synchronization.

Figure 2B:
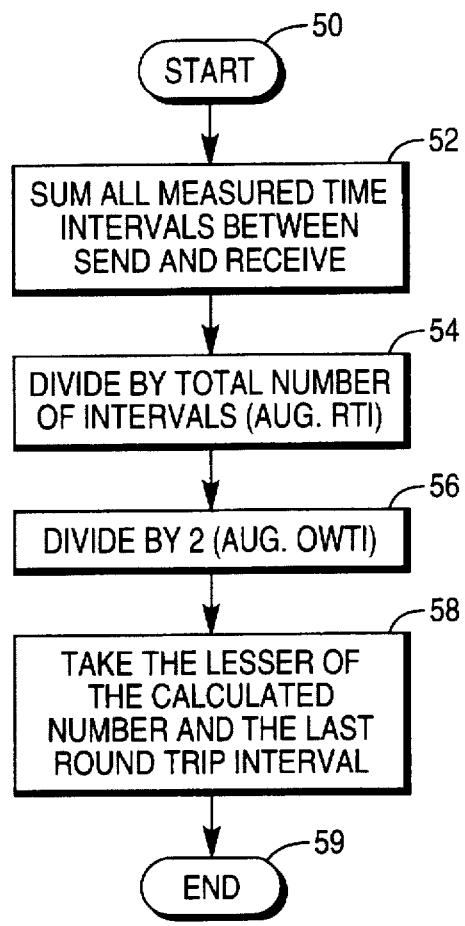
FIG. 2B is a flow chart depicting client computation of a one-way trip interval.
Figure 2C:
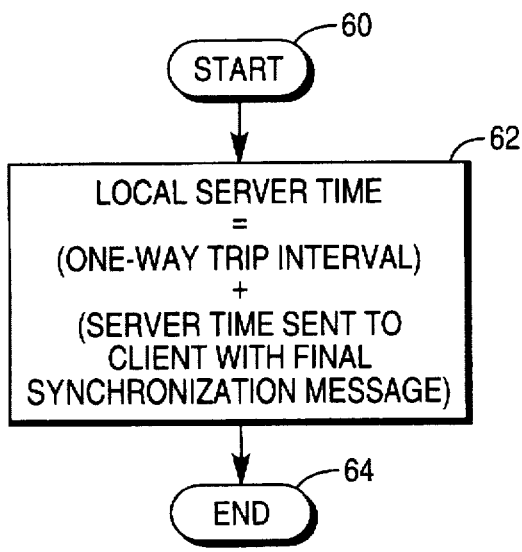
FIG. 2C is a flow chart depicting client computation of current local server time.
Figure 2D:
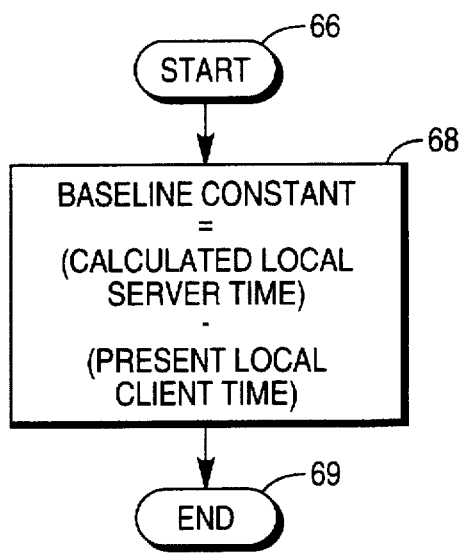
FIG. 2D is a flow chart depicting client computation of a baseline constant.

FIGS. 2B, 2C, and 2D further describe steps 40, 42, and 44 of FIG. 2A respectively. Each flow chart in FIGS. 2B, 2C, and 2D provides a more detailed description of client computations during synchronization, in this embodiment of the invention.

Computation of the one-way trip interval (step 40 of FIG. 2A) is depicted in FIG. 2B. The computation begins at start step 50, and proceeds to step 52 where all time intervals between the send and receive, the intervals tracked in step 36 of FIG. 2A, are summed to determine a total. At step 54 the total number of time intervals are divided into the sum of all time intervals between sending and receiving, to determine the average round trip interval between send and receive. At step 56, the average round trip interval is divided in half to determine the average one-way trip interval. At step 58 a minimum function is employed to provide an upper bound on the one-way trip interval. This is done by taking the lower of the calculated one-way trip interval and the last round trip time interval of the synchronization. At step 59, the computation of the one-way trip interval ends.

Client-side computation of the local server time (step 42 of FIG. 2A) is depicted in FIG. 2C. This computation begins with start step 60 and proceeds to step 62, where the local server time is determined by summing the one-way trip interval time determined at step 40 of FIG. 2A, with the local server time sent to the client with the final synchronization message. Computation of local server time concludes at end step 64.

Client computation of the baseline constant (step 44 of FIG. 2A) is depicted in FIG. 2D. The computation of the baseline constant begins at start step 66 and continues to step 68 where the baseline constant is calculated by subtracting the present local client time from the local server time calculated in step 42 of FIG. 2A. The calculation is concluded at end step 69, which concludes the computation of the baseline constant.

Figure 2E:
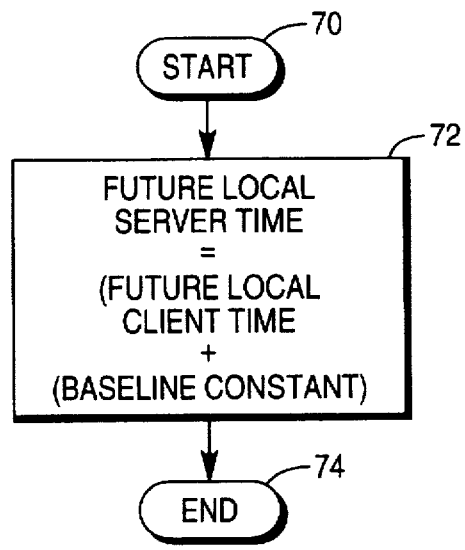
FIG. 2E is a flow chart depicting client computation of future local server time.

FIG. 2E depicts all future computations by the client of the local server time, for all future local client times. Computation begins at start step 70 and proceeds to step 72, where the future local server time is computed by adding the baseline constant to the future local client time. Computation is completed at end step 74.

Figure 3:
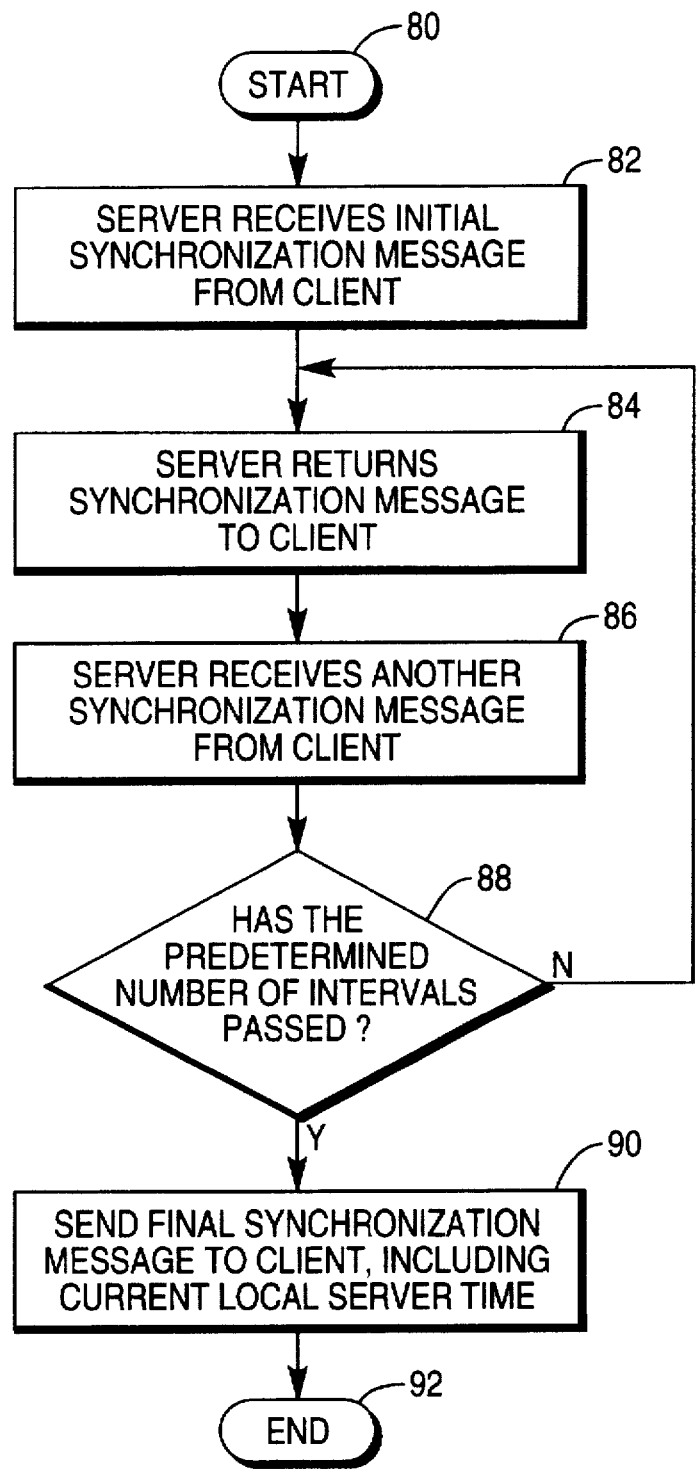
FIG. 3 is a flow chart depicting the steps performed by a server application according to this invention.

FIG. 3 depicts the logic performed by software components on servers 12, 14, 16 in one preferred embodiment of the invention. Server side timer synchronization begins at start step 80 and proceeds to step 82 where the server receives an initial synchronization message from the client. At step 84, the server returns the synchronization message to the client, and at step 86 the server receives another synchronization message from the client. At decision step 88, the server determines if it has received a predetermined number of synchronization messages from the client. If the predetermined number of synchronization messages has not been received from the client, the server proceeds to step 84 and returns another synchronization message to the client. If at step 88, the server has received the predetermined number of synchronization messages from the client, the server sends a final synchronization message to the client, including the current local server time. This ends the server side timer synchronization at step 92.

Figure 4:
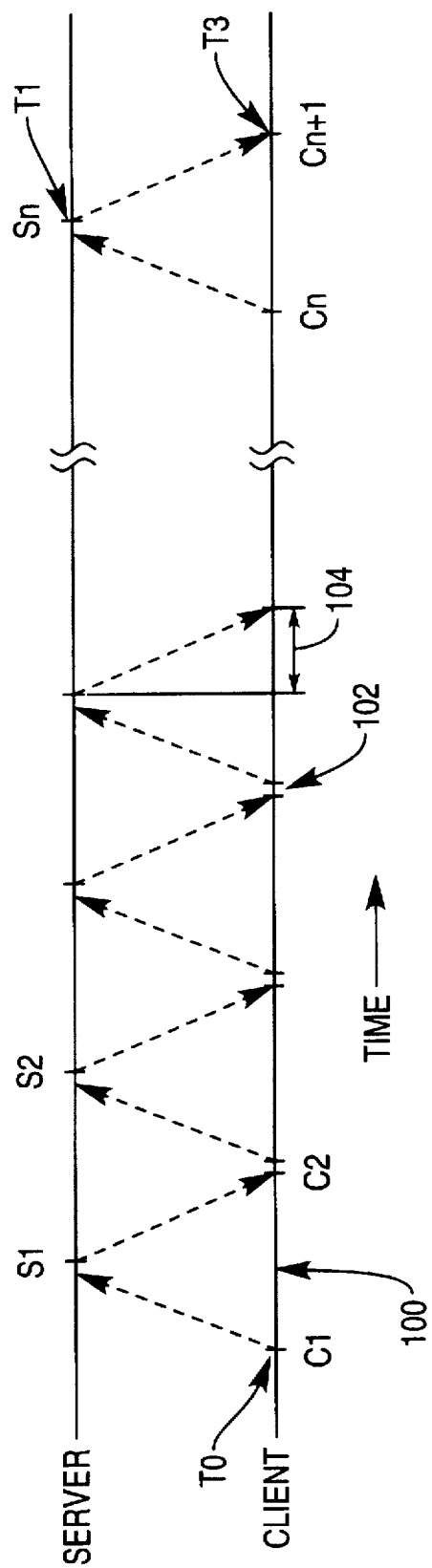
FIG. 4 is a timing chart illustrating the interval timing when synchronizing the client and server.

FIG. 4 is a timing diagram which depicts a passing of a synchronization message a predetermined number of times between a particular client and the server. In this case the client initiates the synchronization protocol. In this diagram, the predetermined number of times is equal to the constant n.

At initial server time T0, the client (at its local time C1) initiates synchronization by sending a message to the server, which receives the message at subsequent server time S1. The server receives and recognizes this client's synchronization message at subsequent server times S1, S2, . . . , Sn. The nth time the server receives the message (i.e., at server time Sn=T1), it ends the synchronization protocol by sending its current time back to the client which receives it at final server time T3, where Cn+1 represents the client's local time when it receives the last synchronization message from the server. The message's alternating network route between server and client is shown by dotted line arrows. Note that in general, T0 is not equal to C1 and T3 is not equal to Cn+1, even though these times are the same relative to a global clock outside this system.

The first network round trip interval 100 computed by the client is the difference in its local send times or C2−C1. In general, any client round trip interval (RTI) can be adequately estimated as the difference, Ci+1−Ci. The processing time used by the client and server 102 (depicted as small gaps between the head of each arrow and the next labeled hash mark on each time line) is assumed to be negligible when compared with RTIs.

The spacing of the arrows in the diagram suggests that message one-way trip intervals (OWTI) 104 tend to be constant but for small, random variances, during the synchronization interval. When network conditions allow this, the accuracy of this method is best. The number of synchronization intervals is assumed to be few (i.e., n<10) for most applications, and it seems likely that point-to-point network conditions would hold fairly constant for short intervals. Also note that the following inequality must hold: T3−T1<Cn+1−Cn. This places an upper bound on the last OWTI of the synchronization message.

Several formulae provide guidance in performing the synchronization task. Assuming that OWTI tends towards an average over some number of network hops, the client may estimate the current time on the server, TS, as: $TS=T1+\min[\Sigma(Ci+1-Ci)/2n, Cn+1-Cn]$, the summation for all i such that $1<i<n+1$.

This formula computes the average client RTI and divides it by two, adding this result to the server's current time, T1, as it last returned the synchronization message to the client. The last message RTI time, Cn+1−Cn, serves as an upper bound on this estimate and is enforced by the MIN operator in formula 1.

The synchronization by the client is completed by immediately subtracting its notion of local time, Cn+1, from TS above to derive a baseline value, TB (formula 2): TB=TS −Cn+1. Any future server time, FT>TB, corresponding to a local client time of Cn+j, can then be computed quickly and independently of the server by formula 3: FT+TB+Cn+j, for all j>0. The synchronization is thus completed for one client, and synchronized timers for additional clients can be established in the manner described above.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for synchronizing clocks between a client and a server in a computer-implemented network, comprising the steps of:
   (a) exchanging synchronization messages between the client and the server a predetermined number of times, the synchronization message from server to client including a transmitted server time;
   (b) computing at the client round-trip interval times for the exchanged synchronization messages;
   (c) computing at the client a local server time based on the computed round-trip interval times and the transmitted server time; and
   (d) offsetting the clock at the client to correspond to the computed local server time.

2. The method of claim 1 wherein the step (a) of exchanging synchronization messages includes the step of sending a synchronization message from a client to a server on a communication network.

3. The method of claim 2 wherein the step (a) of exchanging synchronization messages includes the step of receiving a return synchronization message from the server at the client on the communication network.

4. The method of claim 1 wherein the step (b) of computing round-trip interval times includes the step of computing at the client an individual round-trip interval time between the sending and receiving steps by sampling a local hardware clock.

5. The method of claim 4 wherein the step (c) of computing a local server time includes the step of computing at the client an average round-trip interval time by summing the individual round-trip interval times and dividing by the predetermined number of times.

6. The method of claim 5 wherein the step (c) of computing the local server time includes the step of computing at the client a one-way trip interval time by dividing the average round-trip interval time in half.

7. The method of claim 6 wherein the step of computing the one-way trip interval time includes establishing an upper bound on the one-way trip interval time equal to a last round-trip interval time of the synchronization.

8. The method of claim 7 wherein the step (c) of computing the local server time includes the step of adding at the client the one-way trip interval time to the transmitted server time, the sum being equal to the computed local server time.

9. The method of claim 1 further including the step of computing at the client a baseline constant by subtracting current local client time from the computed local server time.

10. The method of claim 9 further including the step of independently computing at the client any future local server time by adding future local client time to the baseline constant.

11. A system for synchronizing clocks between a client and a server in a computer-implemented network, comprising:
  (a) means for exchanging synchronization messages between the client and the server a predetermined number of times, the synchronization message from server to client including a transmitted server time;
  (b) means for computing at the client round-trip interval times for the exchanged synchronization messages;
  (c) means for computing at the client a local server time based on the computed round-trip interval times and the transmitted server time; and
  (d) means for offsetting the clock at the client to correspond to the computed local server time.

12. The system of claim 11 wherein the means for exchanging synchronization messages (a) includes means for sending a synchronization message from a client to a server on a communication network.

13. The system of claim 12 wherein the means for exchanging synchronization messages (a) includes means for receiving a return synchronization message from the server at the client on the communication network.

14. The system of claim 11 wherein the means for computing round-trip interval times (b) includes means for computing at the client an individual round-trip interval time between the sending and receiving means by sampling a local hardware clock.

15. The system of claim 14 wherein the means for computing a local server time (c) includes means for computing at the client an average round-trip interval time by summing the individual round-trip interval times and dividing by the predetermined number of times.

16. The system of claim 15 wherein the means for computing the local server time (c) includes means for computing at the client a one-way trip interval time by dividing the average round-trip interval time in half.

17. The system of claim 16 wherein the means for computing the one-way trip interval time includes means for establishing an upper bound on the one-way trip interval time equal to a last round-trip interval time of the synchronization.

18. The system of claim 17 wherein the means for computing the local server time (c) includes means for adding at the client the one-way trip interval time to the transmitted server time, the sum being equal to the computed local server time.

19. The system of claim 11 further including means for computing at the client a baseline constant by subtracting current local client time from the computed local server time.

20. The system of claim 19 further including means for independently computing at the client any future local server time by adding future local client time to the baseline constant.

21. One or more program storage devices readable by a computer having a memory and coupled to a data storage device, each of the program storage devices tangibly embodying one or more programs of instructions executable by a computer to perform method steps for synchronizing clocks between a client and a server in a computer-implemented network, the method comprising the steps of:
  (a) exchanging synchronization messages between the client and the server a predetermined number of times, the synchronization message from server to client including a transmitted server time;
  (b) computing at the client round-trip interval times for the exchanged synchronization messages;
  (c) computing at the client a local server time based on the computed round-trip interval times and the transmitted server time; and
  (d) offsetting the clock at the client to correspond to the computed local server time.

22. The method of claim 21 wherein the step (a) of exchanging synchronization messages includes the step of sending a synchronization message from a client to a server on a communication network.

23. The method of claim 22 wherein the step (a) of exchanging synchronization messages includes the step of receiving a return synchronization message from the server at the client on the communication network.

24. The method of claim 21 wherein the step (b) of computing round-trip interval times includes the step of computing at the client an individual round-trip interval time between the sending and receiving steps by sampling a local hardware clock.

25. The method of claim 24 wherein the step (c) of computing a local server time includes the step of computing at the client an average round-trip interval time by summing the individual round-trip interval times and dividing by the predetermined number of times.

26. The method of claim 25 wherein the step (c) of computing the local server time includes the step of computing at the client a one-way trip interval time by dividing the average round-tip interval time in half.

27. The method of claim 26 wherein the step of computing the one-way trip interval time includes establishing an upper bound on the one-way tip interval time equal to a last round-trip interval time of the synchronization.

28. The method of claim 27 wherein the step (c) of computing the local server time includes the step of adding at the client the one-way trip interval time to the transmitted server time, the sum being equal to the computed local server time.

29. The method of claim 21 further including the step of computing at the client a baseline constant by subtracting current local client time from the computed local server time.

30. The method of claim 29 further including the step of independently computing at the client any future local server time by adding future local client time to the baseline constant.

* * * * *